(12) United States Patent
Paesano et al.

(10) Patent No.: US 9,182,227 B1
(45) Date of Patent: *Nov. 10, 2015

(54) CLAMPS AND METHODS OF USING CLAMPS TO MEASURE ANGULAR POSITIONS OF COMPONENTS

(71) Applicant: The Boeing Company, Chicago, IL (US)

(72) Inventors: Antonio Paesano, Newark, DE (US); Francis Kendra, Aston, PA (US); Frank J. Gill, Conshohocken, PA (US)

(73) Assignee: THE BOEING COMPANY, Chicago, IL (US)

( * ) Notice: Subject to any disclaimer, the term of this patent is extended or adjusted under 35 U.S.C. 154(b) by 263 days.

This patent is subject to a terminal disclaimer.

(21) Appl. No.: 13/893,091

(22) Filed: May 13, 2013

Related U.S. Application Data

(63) Continuation-in-part of application No. 13/370,052, filed on Feb. 9, 2012, now Pat. No. 8,769,839.

(51) Int. Cl.
*G01C 9/06* (2006.01)
*G01C 9/02* (2006.01)
*G01B 3/00* (2006.01)

(52) U.S. Cl.
CPC . *G01C 9/02* (2013.01); *G01B 3/002* (2013.01)

(58) Field of Classification Search
CPC .............. G01B 3/56; G01B 7/30; G01C 1/00; G01C 9/06
USPC ...... 33/1 N, 301, 347, 355, 365, 366.11, 534, 33/537, DIG. 1
See application file for complete search history.

(56) References Cited

U.S. PATENT DOCUMENTS

| | | | |
|---|---|---|---|
| 2,606,470 A * | 8/1952 | Kinney | 269/276 |
| 4,394,799 A | 7/1983 | Moree et al. | |
| 4,908,949 A | 3/1990 | Jaccard | |
| 5,063,679 A | 11/1991 | Schwandt | |
| 5,617,072 A | 4/1997 | McNeal | |
| 6,449,987 B1 | 9/2002 | Poole | |
| 6,644,081 B1 | 11/2003 | Berry | |
| 6,880,258 B2 | 4/2005 | Adams et al. | |
| 6,910,429 B1 | 6/2005 | Matay et al. | |
| 7,871,179 B1 | 1/2011 | Edgar | |
| 8,769,839 B1 | 7/2014 | Paesano et al. | |
| 2007/0209223 A1 | 9/2007 | Frank | |
| 2009/0021447 A1 | 1/2009 | Austin et al. | |
| 2013/0032135 A1 | 2/2013 | Waterhouse et al. | |
| 2013/0151195 A1 | 6/2013 | Marinoni | |
| 2013/0154624 A1 | 6/2013 | Taylor | |

OTHER PUBLICATIONS

United States Patent and Trademark Office, "Notice of Allowance," issued in connection with U.S. Appl. No. 13/370,052, Mar. 20, 2014, 17 pages. (not provided as is a USPTO document).

* cited by examiner

*Primary Examiner* — G. Bradley Bennett
(74) *Attorney, Agent, or Firm* — Hanley, Flight & Zimmerman, LLC

(57) ABSTRACT

Methods and apparatus to measure an angular position of craft components are disclosed. An example apparatus includes an opening to receive a component along a first plane, and a first magnetic coupler positioned along a first exterior side of the apparatus to removably couple an inclinometer to the apparatus at a first angle relative to the first plane.

24 Claims, 13 Drawing Sheets

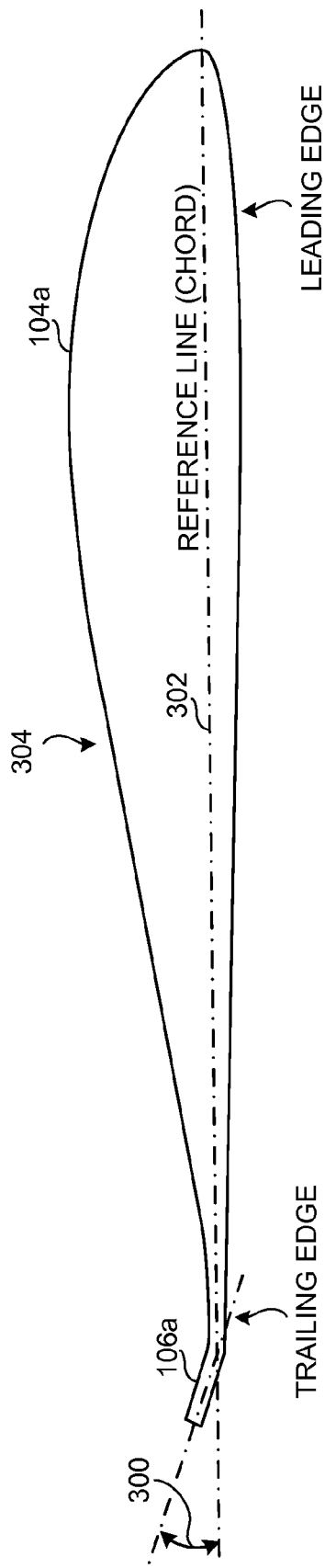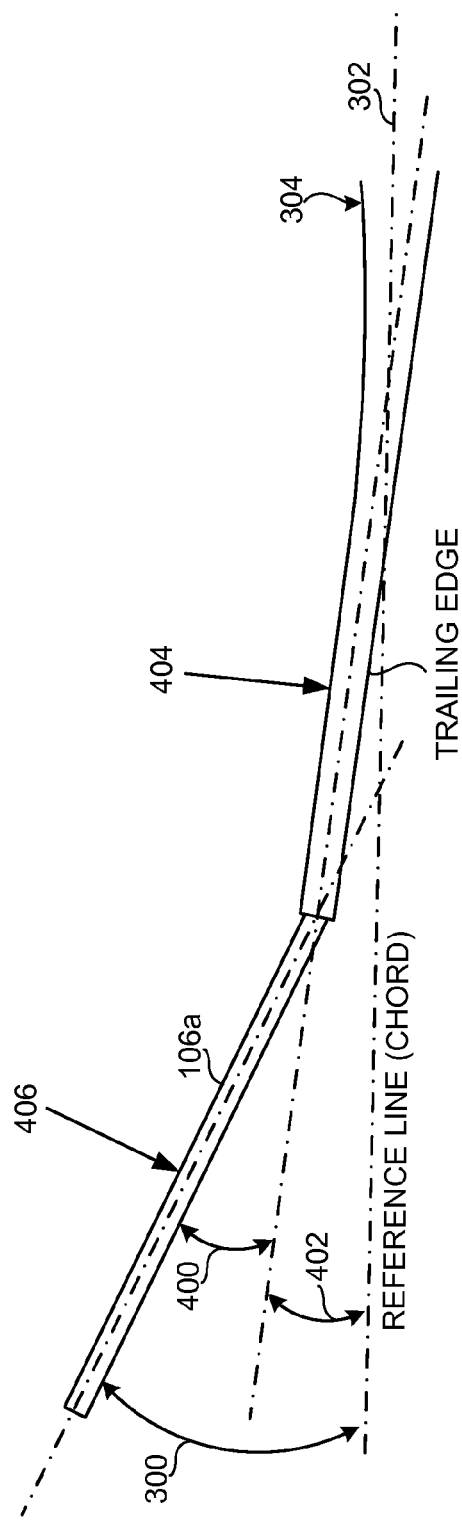
FIG. 3
FIG. 4

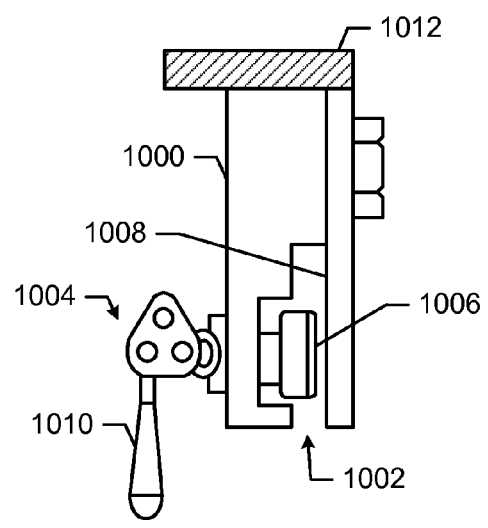 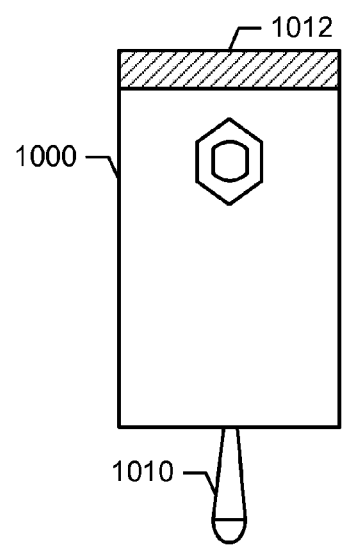
FIG. 10A  FIG. 10B

CLAMPS AND METHODS OF USING CLAMPS TO MEASURE ANGULAR POSITIONS OF COMPONENTS

RELATED APPLICATION

This patent arises from a continuation-in-part of U.S. patent application Ser. No. 13/370,052, filed Feb. 9, 2012, now U.S. Pat. No. 8,769,839, which is hereby incorporated herein by reference in its entirety.

GOVERNMENT LICENSE RIGHTS

This disclosure was made with Government support under Contract No. DAAH23-02-D-0307 awarded by the United States Department of Defense. The Government of the United States may have certain rights in this disclosure.

FIELD OF THE DISCLOSURE

This disclosure relates generally to measurement devices and, more particularly, to clamps and methods of using clamps to measure angular positions of components.

BACKGROUND

Effective operation and maintenance of a craft, such as an aircraft or a watercraft, involves properly configuring and orienting components of the craft. Trim tabs are often used to adjust and/or stabilize an orientation of a component of a craft. For example, trim tabs are often used on helicopters and other rotocraft that use one or more rotor blades coupled to a rotor to provide lift and thrust. In such instances, a trim tab is attached to a trailing edge of one or more of the rotor blades to assist in aligning tracking paths or planes of rotation of the individual rotor blades with each other so that all of the rotor blades are in track.

Configuring and adjusting a trim tab involves measuring an angle or inclination of the trim tab relative to, for example, the trailing edge of the corresponding rotor blade. Crafts on which the trim tabs are implemented benefit from accurate and precise measurement of the angle of the trim tab. The more accurately and precisely the angle of the trim tab is measured, the better the corresponding rotor blades can be aligned. Moreover, operators measuring the trim tab angle benefit from more convenient measurement processes and/or devices.

SUMMARY

Methods and apparatus to measure angular positions of components are disclosed. A disclosed example apparatus to measure an angular position of a component of a rotor blade includes a rigid plate including brackets to define an opening having a shape complimentary to an airfoil of the rotor blade, and a first surface to removably couple a first angular position sensor to the rigid plate. The example apparatus includes a slotted block including a coupler to secure the slotted block to the component, and a second surface to removably couple a second angular position sensor to the slotted block.

A disclosed second example apparatus to measure an angular position of a component of a rotor blade includes means for obtaining a reference angle having an opening to receive a portion of the rotor blade, the opening being shaped similarly to an airfoil of the rotor blade, wherein the means for obtaining the reference angle includes a first planar surface to receive a first sensor for obtaining the reference angle. The second example apparatus includes means for obtaining a measured angle of the component of the rotor blade, the means for obtaining the measured angle to be coupled to the component via a coupler such that a second planar surface of the means for obtaining the measured angle is aligned with the component, wherein the second planar surface is to receive a second sensor for obtaining the measured angle.

A disclosed example method to measure an angular position of a component of a rotor blade includes securing a block to the component, the block having a first planar surface oriented in relation to the component when the block is secured to the component; coupling a first digital sensor to the first planar surface to electronically obtain a first angular measurement; placing a rigid plate on the rotor blade, the rigid plate having an opening shaped similarly to an airfoil of the rotor blade, the rigid plate having a second planar surface oriented in relation to a chord reference line of the airfoil when the rigid plate is placed on the rotor blade; coupling a second digital sensor to the second planar surface to electronically obtain a second angular measurement; and comparing the first and second angular measurements to obtain a relative angular position of the component.

A disclosed third example apparatus includes a clamp to secure a component to a receiving surface, the clamp having a first exterior side to be oriented relative to the receiving surface at a first angle, wherein the first exterior side is to removably couple a first sensor of a digital protractor to the clamp at the first angle, and a second exterior side to be oriented relative to the receiving surface at a second angle, wherein the second exterior side is to removably couple the first sensor of the digital protractor to the clamp at the second angle. The third example apparatus includes a rigid plate including an opening having a shape complimentary to an airfoil of a rotor blade, the rigid plate having a first surface to removably couple a second sensor of the digital protractor to the rigid plate.

BRIEF DESCRIPTION OF THE DRAWINGS

FIG. 3 is a first cross-sectional view of the example rotor blade of FIG. 2.

FIG. 4 is a cross-sectional view of the trailing edge of the example rotor blade of FIGS. 2 and/or 3.

FIG. 10A is an illustration from a first perspective of an example slotted block constructed in accordance with teachings of this disclosure.

FIG. 10B is an illustration from a second perspective of the example slotted block of FIG. 10A.

Figure 1:
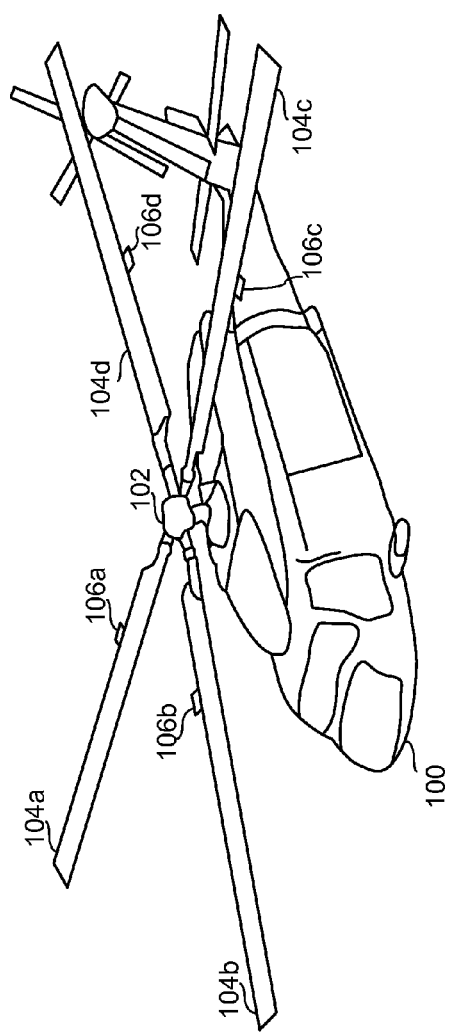
FIG. 1 is an illustration of an example rotocraft.

To clarify multiple layers and regions, the thicknesses of the layers are enlarged in the drawings. Accordingly, the structures illustrated in the drawings are not drawn to scale and, instead, are drawn to clarify the teachings of this disclosure. Wherever possible, the same reference numbers will be used throughout the drawing(s) and accompanying written description to refer to the same or like parts. As used in this patent, stating that any part (e.g., a layer, film, or area) is in any way positioned on (e.g., positioned on, located on, disposed on, attached to, or formed on, etc.) another part, means that the referenced part is either in contact with the other part, or that the referenced part is adjacent the other part with one or more intermediate part(s) located therebetween. Stating that any part is in contact with another part means that there is no intermediate part between the two parts.

DETAILED DESCRIPTION

FIG. 1 shows an example craft in which example methods and apparatus disclosed herein may be utilized. While an example craft is shown in FIG. 1, example methods and apparatus disclosed herein may be implemented in connection with other types of aircraft, watercraft, and/or any other type of craft. FIG. 1 shows a helicopter 100 having a rotor 102 that drives a plurality of rotor blades 104. The rotor 102 spins the blades 104 to provide the helicopter 100 with lift. As the blades 104 spin through air, each one of the blades 104 rotates along a tracking path or plane of rotation. The amount of lift provided by each one of the blades 104 and the tracking path traveled by each one of the blades 104 depends on a plurality of characteristics of the respective blade. For example, each one of the blades 104 has a particular airfoil, a weight distribution, a twist, a chord length, etc. While the helicopter 100 is likely constructed with blades of the same design and manufacturing process, minor variations between the blades 104 are inevitable due to, for example, wear and tear, manufacturing tolerances, material inconsistencies, etc. Even minor variations between characteristics of the individual blades 104 cause the natural tracking paths of the blades 104 to differ with respect to each other. Additionally, even though the tracking paths of the blades 104 may be aligned at one point in time, the blades 104 can fall out of alignment due to changing characteristics of the blades 104, unintended rearrangements or shifts during operation, vibrations, rotor functionality, etc.

Figure 2:
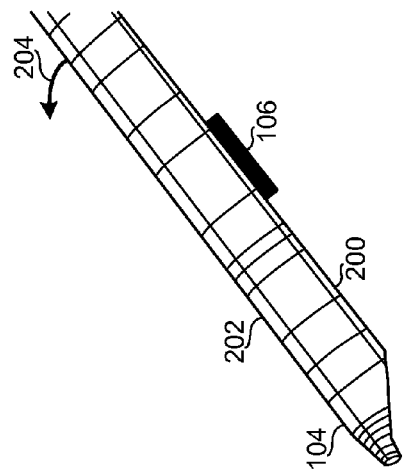
FIG. 2 is a schematic illustration of a rotor blade of the example rotocraft of FIG. 1 that includes a trim tab.

The example helicopter 100 of FIG. 1 includes a plurality of adjustable trim tabs 106 to help align the tracking paths of the blades 104 along a common plane of rotation. An example one of the trim tabs 106 is shown in FIG. 2. As shown in FIG. 2, the trim tab 106 is mounted to a trailing edge 200 of the rotor blade 104. The trailing edge 200 of the blade 104 is opposite a leading edge 202 that leads the trailing edge when the blade 104 rotates. In the illustrated example, the direction of rotation is shown by an arrow 204. The example trim tab 106 of FIG. 2 can be of any suitable shape or size and is rigidly adjustable to a plurality of angular positions (e.g., relative to a surface of the trailing edge 200). Further, the example trim tab 106 of FIG. 2 can be adjustable in any suitable manner such as, for example, electronically with a programmable controller and/or manually.

Referring to FIG. 1, when a first one of the blades 104a is tracking along a different plane of rotation than a second one of the blades 104b, a first one of the trim tabs 106a mounted to the first blade 104a can be angled (e.g., bent) upward to a greater angle or angled (e.g., bent) downward to a lesser angle to align the tracking path of the first blade 104a with the tracking path of the second blade 104b. Alternatively, a second one of the tabs 106b mounted to the second blade 104b can be angled (e.g., bent) upward or downward to align the tracking path of the second blade 104b with the tracking path of the first blade 104a. Alternatively, the first and second trim tabs 106a and 106b can be adjusted to bring the first and second blades 104a and 104b in track. The angle at which the trim tabs 106 are positioned is rigidly maintained to stabilize an angle of attack of the corresponding blades 104. In the context of a rotor blade, the angle of attack refers to an angle between a chord of an airfoil of the rotor blade and a line representing undisturbed relative air flow surrounding the rotor blade. When one of the trim tabs 106 is angled upward relative to a base position (e.g., zero degrees), the airfoil pitches upward. As a result, the airfoil tracks with a greater angle of attack in comparison to the same airfoil having the trim tab 106 in the base position. When one of the trim tabs 106 is angled downward relative to the base position, the airfoil pitches downward. As a result, the airfoil tracks with a lesser angle of attack in comparison to the same airfoil having the trim tab 106 in the base position. Thus, to bring the blades 104 of the helicopter 100 in track, the angular position of the trim tab(s) 106 of FIG. 1 is adjusted to stabilize the tracking paths of the respective blades 104 along a desired common plane of rotation.

The angular position of the trim tabs 106 that is measured as part of an adjustment of the trim tabs 106 described above is illustrated in FIGS. 3 and 4. In particular, FIG. 3 is a cross-sectional view of the first rotor blade 104a of the example helicopter 100 of FIG. 1. As described above in connection with FIG. 2, the trim tab 106a mounted to the first blade 104a is fixed to the trailing edge of the first blade 104a. In the example of FIG. 3, an angular position 300 of the trim tab 106a is measured relative to a chord 302 of an airfoil 304 of the blade 104a. In the illustrated examples herein, the chord 302 is a reference line that is oriented at a known angle and used as a basis for the angular measurements disclosed herein. The angular position of the chord 302 can be obtained through experimentation and/or with precise placement of the corresponding rotor blade during the measurements disclosed herein. As shown in FIG. 3, the trim tab 106a is angled (e.g., bent) upward relative to the chord 302. Therefore, the angular position 300 shown in FIG. 3 is a positive angle. While shown angled (e.g., bent) upward in FIG. 3, the trim tab 106a can alternatively be angled (e.g., bent) downward, below the chord 302. In such instances, the angular position 300 is a negative angle. Thus, the angular position 300 of the trim tab 106a can be adjusted to a positive angle to cause the airfoil 304 to pitch upward. Conversely, the angular position 300 of the trim tab 106a can be adjusted to a negative angle to cause the airfoil 304 to pitch downward.

FIG. 4 shows a detailed view of the trailing edge of the airfoil 304 shown in FIG. 3. Specifically, FIG. 4 shows an additional or alternative expression of the angle of the trim tab 106a. In particular, an angular position 400 of the trim tab 106a is expressed in FIG. 4 in relation to an angular position 402 of the trailing edge of the airfoil 304 relative to the chord 302 of the airfoil 304. In contrast, the angular position 300 of the trim tab 106a in FIG. 3 is expressed in relation to the chord 302 of the airfoil 304. As shown in FIG. 4 the trailing edge of the airfoil 304 may be oriented at a first angle relative to the chord 302 of the airfoil 304. While shown in FIG. 4 as angled upward relative to the chord 302, the trailing edge of the airfoil 304 may be angled downward. Further, while the trim tab 106a is shown in FIG. 4 is shown as angled upward, the trim tab 106a can be angled downward relative to the trailing edge angular position 402 and/or the chord 302. Further, the angles 300, 400, and 402 of FIGS. 3 and 4 are shown as example angles with example reference lines (e.g., the chord 302). As described in detail below, additional or alternative angles with additional or alternative reference points can be calculated using the example disclosed herein.

Having generally described trim tabs and the utilization thereof by the helicopter 100 of FIG. 1 to align the blades 104 along a common plane of rotation, the following description and FIGS. 5-14 provide example methods and apparatus that improve the resolution, accuracy, precision and convenience with which the angular positions of the trim tabs 106 are measured. As described above, controlling the blades 104 of the helicopter 100 to be in track improves stability, performance, durability, control, predictability, etc. Further, the angular positions of the trim tabs 106 (e.g., the angular position 300 of the trim tab 106a as expressed in FIG. 3 and/or the angular position 400 of the trim tab 106a as expressed in FIG. 4) are adjusted to bring the blades 104 of the helicopter 100 in track. Accordingly, convenient, accurate and precise measurements of the angular positions of the trim tabs 106 are needed to configure the blades 104 and, thus, operate the helicopter 100.

Previous techniques for measuring the angular position of a trim tab include using a pointer in conjunction with a scribed dial having a plurality of divisions marked on an apparatus. The apparatus of the previous technique is mounted to the rotor blade and the pointer is attached to the trim tab being measured. When attached to the trim tab, the pointer points to a segment of the scribed dial on the apparatus mounted to the rotor blade. The scribed dial of the previous technique includes one-degree divisions. After attaching the pointer to the trim tab and mounting the apparatus to the rotor blade, an operator visually determines the segment of the scribed dial to which the pointer is pointing. That is, the operator uses the visual determination to estimate the value indicated by the pointer on the scribed dial. The indicated value on the scribed dial corresponds to the estimated angular position of the trim tab.

Trim tab angle calculations made using the pointer-dial technique have a resolution or precision of approximately one half of a degree, at best, as the reading is dependent on operator eyesight, manual alignment of the pointer and the apparatus on which the scribed dial is marked, and alignment of the eyes of the operator to the pointer, variations which can cause parallax error. The manual readings using the pointer-dial technique are also subject to operator error as the measurement mechanism relies on human estimation of a reading. Further, the pointer and the apparatus on which the dial is scribed are heavyweight objects that must be transported and carefully aligned on the rotor blades. In some instances, the weight of the pointer and/or dial apparatus may negatively influence integrity of (e.g., bend or twist) a rotor blade. Further, the pointer-dial technique is a time consuming measurement process.

For many rotor blades having trim tabs, the pointer-dial technique was necessary (prior to the example methods and apparatus disclosed herein) despite the availability of digital inclinometers due to the size of digital inclinometers. That is, the trim tabs and/or the rotor blades of many crafts do not have enough surface area to properly support a digital inclinometer, which requires a certain size (e.g., greater than a threshold surface area) to operate properly, in the proper orientation needed to take a reading of the angular position of the trim tab in relation to, for example, the trailing edge of the rotor blade.

Figure 5:
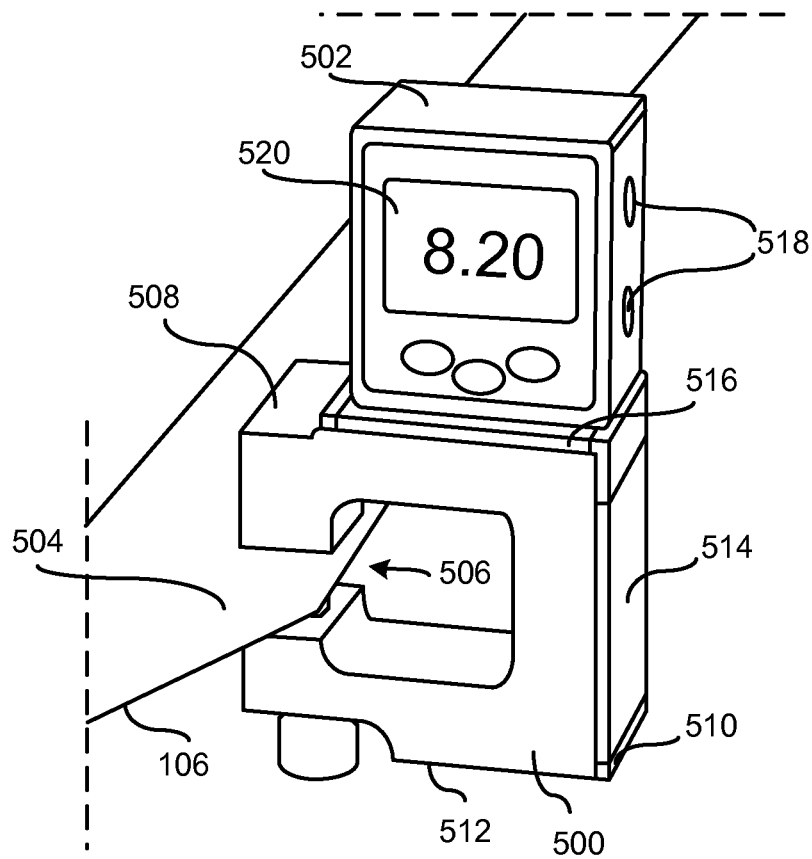
FIG. 5 is an illustration of an example clamp constructed in accordance with teachings of this disclosure.

FIG. 5 illustrates a clamp 500 that enables use of a digital inclinometer 502 to measure an angular position of, for example, the trim tabs 106 of FIGS. 1-4 and/or the corresponding trailing edges of the blades 104 of FIGS. 1-4. While the example clamp 500 of FIG. 5 is described herein in connection with the trim tabs 106 and the trailing edges of the blades 104, the example clamp 500 of FIG. 5 can be used to measure an angular position of any component relative to any other component or reference surface or point.

To enable use of digital inclinometers, the example clamp 500 of FIG. 5 extends an effective surface area of the component for which the angular position is to be measured, such as one of the trim tabs 106 or one of the trailing edges of the blades 104. As shown in FIG. 5, a surface 504 of a trim tab 106 does not have enough area to properly support the digital inclinometer 502. The example clamp 500 of FIG. 5 clamps onto the surface 504 of the trim tab 106 through an open side or opening 506 of the clamp 500. As described in greater detail below in connection with FIGS. 6A and 6B, the example clamp 500 includes a receiving mechanism that causes the clamp 500 to engage the surface 504 of the trim tab 106 at a certain known angle (e.g., ninety degrees or zero degrees) relative to three other sides 508, 510, and 512 of the clamp 500, which are closed sides. In the illustrated example, the clamp 500 is designed and constructed such that the received surface 504 of the trim tab 106 (or any other surface received through the opening 506 of the clamp 500) is perpendicular to the second closed side 510 and parallel to the first and third closed sides 508, 512 of the clamp 500. As the digital inclinometer 502 is capable of providing angular position readings at a resolution of, for example, 0.1 degrees, the clamp 500 is precisely designed and constructed to provide the perpendicular and parallel orientations described herein Further, the clamp 500 is constructed to minimize an amount of bending that may occur during a clamping down on the surface 504 of the trim tab 106. In particular, the clamp 500 is constructed from rigid material(s) and, as described below in connection with FIG. 6B, is designed to have a cross-section that maximizes the ratio of rigidity-to-weight of the clamp 500.

One or more of the closed sides 508, 510, and 512 of the clamp 500 includes a coupling mechanism to receive the digital inclinometer 502. In the illustrated example of FIG. 5, the clamp 500 includes a first magnetic strip 514 embedded in a first one of the closed sides 510 and second magnetic strip 516 embedded in a second one of the closed sides 508. In some examples, the clamp 500 includes additional magnetic strips at different locations, such as the third closed side 512. While shown as embedded or integral with the illustrated examples, the magnetic strips may alternatively be affixed to an exterior surface of the clamp 500. The example embedded magnetic strips 514 and 516 of FIG. 5 are configured to interact with (e.g., magnetically couple to) magnetic material of the digital inclinometer 502 to fix the digital inclinometer 502 to the clamp 500. In the illustrated example, the digital inclinometer 502 includes magnetic material 518 on one or more sides of the inclinometer housing. In particular, the embedded magnetic strips 514 and 516 of the clamp 500 are configured to orient the digital inclinometer 502 to be flush with the corresponding side of the clamp 508 and 510. As described above, the corresponding sides of the clamp 508, 510, respectively, are precisely designed and constructed to be either parallel or perpendicular to the receiving portion or surface of the opening 506. As a result, the digital inclinometer 502 is fixed to the clamp 500 at a known angle (e.g., ninety degrees or zero degrees) relative to the surface 504 received through the opening 506 of the clamp 500. While the example of FIG. 5 utilizes magnets to couple the digital inclinometer 502 to the example clamp 500, additional and/or alternative devices and/or methods, such as mechanical fasteners and/or pressure sensitive adhesives, for example, are available to provide the coupling, which can be removable or more permanently affixed.

A digitally accurate and precise reading can then be taken from an electronic display (e.g., a light emitting diode (LED) display) 520 of the digital inclinometer 502 that represents the angular position of the received surface 504. In the example of FIG. 5, the reading taken from the digital inclinometer 502 is the angle of the received surface 504 relative to gravity. The multiple magnetic strips 514 and 516 of the example clamp 500 and the precise design and construction of the clamp 500 to orient the sides 508-512 at precise angles relative to the received surface 504 enable a plurality of orientations, positions, angles, etc. at which the digital inclinometer 502 can be positioned relative to the trim tab 106. In some examples, the reading of the digital inclinometer 502 taken while coupled to the surface 504 (e.g., the surface of the trim tab 106a of FIG. 4) can be compared to additional readings taken while the digital inclinometer 502 is coupled to a second surface in the same or different orientation. For example, the second surface can be a surface of the trailing edge of the blade 104a of FIG. 4. Alternatively, the second surface can be a surface representative of a chord of an airfoil to be used as a base angle for comparison with a reading taken in connection with the trim tabs 106.

Moreover, by enabling use of the digital inclinometer 502 when measuring an angular position of, for example, the trim tabs 106 and/or the trailing edges of the blades 104, the example clamp 500 enables much higher resolution and more precise measurements and, thus, adjustments of the trim tabs 106 than previous techniques (e.g., using a pointer and a scribed dial mounted to the surface to be measured). In fact, as described above, the previous pointer-dial technique provided a resolution of approximately 0.5 degrees, whereas the example digital inclinometer 502 has a resolution of 0.1 degree or better. Such an improvement in precision and resolution provides great benefit to the craft and the operators tasked with configuring and/or maintaining the craft. For example, the increased precision and resolution provided by the example clamp 500 of FIG. 5 and the resulting increase in precision and resolution of orienting the blades 104 in track reduces a number of flight tests needed. In other words, because the blades 104 of the helicopter 100 are more precisely configured to fly in track, the blades 104 take longer before flying out of track and/or are less likely to fly out of track, thereby reducing an amount of times the blades 104 needs to be adjusted and a number of times the angular position of the trim tabs 106 needs to be measured.

Further, the example clamp 500 reduces the time needed to measure the angular position of, for example, the trim tabs 106. Instead of having to mount the apparatus including the scribed dial, to fix the pointer to a surface of the trim tab, to align the pointer with the scribed dial, to estimate which division of the scribed dial is indicated by the pointer, to dismount the apparatus, and to unfix the pointer from the trim tab surface, an operator utilizing the example clamp 500 of FIG. 5 needs only to mount the clamp 500, take a direct reading from a readout of the digital inclinometer 502, and remove the clamp 500.

Further, the example clamp 500 reduces and/or eliminates user error resulting from the manual reading of the scribed dial of the previous technique. An operator utilizing the example clamp 500 of FIG. 5 records a value displayed on a digital readout. In fact, in some examples, the reading of the digital inclinometer 502 may be automatically logged and/or communicated to a memory or database capable of logging the reading of the digital inclinometer 502, thereby removing a chance of error in manually recording the reading.

Further, the example clamp 500 of FIG. 5 replaces the bulky, heavyweight devices of the pointer-dial technique, which may negatively impact (e.g., bend or twist) a rotor blade, with a lightweight fixture far less likely to negatively impact an integrity of the rotor blade and/or trim tab to which the clamp 500 is fixed.

Figure 6A:
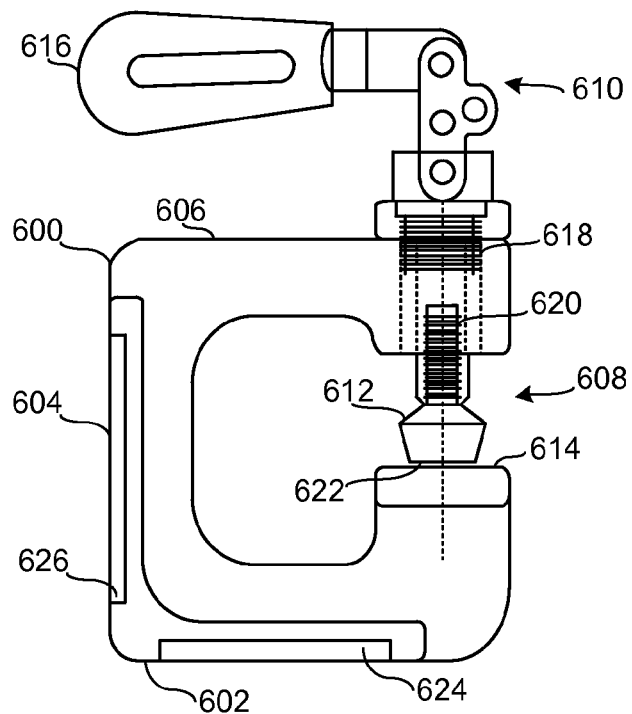
FIG. 6A is a schematic illustration from a first perspective of an example clamp.
Figure 6B:
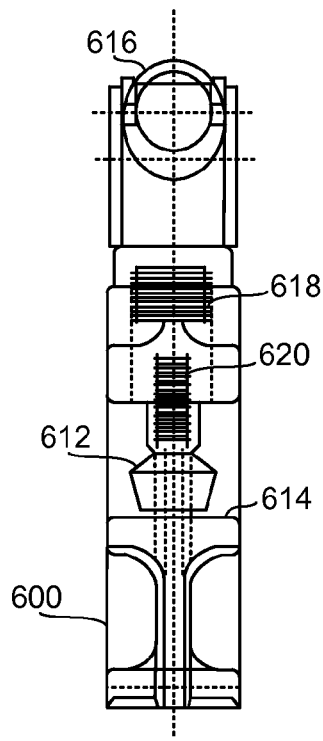
FIG. 6B is a schematic illustration from a second perspective of the example clamp of FIG. 6A.

FIG. 6A is a first schematic illustration of an example clamp 600 similar to the example clamp 500 of FIG. 5. FIG. 6B is a second schematic illustration of the example clamp 600 of FIG. 6A from a second perspective. The example clamp 600 of FIGS. 6A and 6B has a C-shape. However, the example clamps disclosed herein can have any suitable cross section or profile, such as a square, a rectangle, etc. Further, the example clamps disclosed herein, including the clamp 600 of FIGS. 6A and 6B can be constructed of any suitable material and can be solid or hollow. In the illustrated example, the dimensions, materials, and shape of the clamp 600 are selected and designed to maximize a stiffness-to-weight ratio to minimize bending of the surface to be measured (e.g., the trim tab 106 or the trailing edge of the rotor blade 104). As shown in FIG. 6B, a cross section of the clamp 600 includes an I-beam configuration to maximize the stiffness-to-weight ratio, thereby minimizing bending of the surface to be measured. However, other cross-section features can be utilized in the example clamp 600. Further, the material of the clamp 600 is selected to reduce or minimize deflection of sides 602-606 of the clamp 600 when clamping down on a material (e.g., using a clamping mechanism).

As described above in connection with the example clamp 500 of FIG. 5, an opening 608 of the example clamp 600 of FIG. 6A is configured to receive a surface, such as the surface 504 of the trim tab 106 of FIG. 5 and/or the trailing edge 200 of the example rotor blade 104 of FIG. 2. To clamp down on the surface to be received, the example clamp 600 of FIG. 6A includes a clamping mechanism 610 that forces a plunger 612 toward a surface 614 of the opening 608 of the clamp 600. In the illustrated example, the surface 614 is made from a wear resistant material to withstand repetitive engagement with, for example, the trim tabs 106. In some examples, the surface 614 may include a removable and replaceable insert. When a particular insert becomes worn and/or uneven, the insert can be replaced to form an even, unworn instance of the surface 614. The example clamping mechanism 610 of FIG. 6A also includes a handle 616 operatively coupled to the plunger 612 that can be rotated by a user to extend or retract the plunger 612. In particular, the handle 616 is coupled to one or more bolts 618 and 620 that are operatively coupled to the plunger 612. Rotation of the handle 616 in a first direction causes the bolts 618 to rotate in a first direction, thereby causing the plunger 612 to extend. Rotation of the handle 616 in a second direction causes the bolts 618 to rotate in a second direction, thereby causing the plunger to retract. A surface 622 of the plunger 612 or the entire plunger 612 can be replaced when the surface 622 of the plunger 612 becomes uneven due to, for example, wear and tear. The rotation of the handle 616 in a first direction (e.g., clockwise) causes the bolts 618 and 620 to extend the plunger 612 towards the surface 614, and the rotation of the handle 616 in a second direction (e.g., counterclockwise) causes the bolts 618 and 620 to retract the plunger 612 away from the surface 614. While shown as including the handle 616 and the bolts 618, 620 in FIG. 6A, the example clamping mechanism 610 can include any suitable components or devices (e.g., toggle clamp(s), cam-type snapping mechanism(s), etc.) to secure the receiving surface 614 of the clamp 600 to a surface to be measured (e.g., the trim tab 106a) such that both sides of the surface to be measured come into contact with the clamp 600.

Thus, to receive a component, such as one of the trim tabs 106 of FIGS. 1-4, the handle 616 is rotated in the second direction (if necessary) to create a gap between the plunger 612 and the surface 614. When the surface to be measured is between the plunger 612 and the surface 614, the handle 616 is rotated in the first direction to force the plunger 612 onto surfaces of the component. The handle 616 is rotated in the first direction until the clamp 600 is securely fixed to the component.

In the illustrated example of FIGS. 6A and 6B, the surface 614 is oriented at a known angle relative to the three sides 602, 604, and 606 of the clamp 600. In particular, the surface 614 is oriented ninety degrees (perpendicular) relative to the second one of the sides 604 and zero degrees (parallel) to the first and third 602 and 606 sides. The example clamp 600 includes a first coupler 624 along the first side 602 and a second coupler 626 along the second side 604. Accordingly, when the digital inclinometer 502 of FIG. 5 is coupled to one of the couplers 624, 626 of the clamp 600, the angle between the surface 614 and the side to which the digital inclinometer 502 is coupled is known to be parallel or a right angle. In the illustrated example of FIG. 6A, the first coupler 624 is a magnet (e.g., in the shape of a magnetic strip) embedded along the first side 602 and the second coupler 626 is a magnet (e.g., in the shape of a magnetic strip) embedded along the second side 604. The digital inclinometer 502 may include magnetic material on one or more sides and, thus, can be coupled to the clamp 600 in any desired orientation. The different orientations of the first and second couplers 624, 626 enable the digital inclinometer 502 of FIG. 5 to be coupled to the clamp 600 in different orientations, thereby enabling a range of orientations in which the clamp 600 can measure angular positions of surfaces received along the receiving surface 614. For example, to take a reading in a first orientation (e.g., position relative to the trim tab), the digital inclinometer 502 can be placed on the first side 602 of the clamp 600 using the corresponding embedded magnet 624. To take a second reading in a second orientation, the digital inclinometer 502 can be placed on the second side 604 of the clamp 600 using the corresponding embedded magnet 604. Additionally or alternatively, to utilize the digital inclinometer 502 having magnetic material on more than one side, the example clamp 600 enables the digital inclinometer 502 to be removably (e.g., magnetically) coupled to the same one of the magnets 624, 626 in a plurality of different orientations. The first and second magnets 624 and 626 and the different coupling orientations provided thereby also enable the clamp 600 to be attached to a range of surfaces fixed in a position or location that otherwise restricts coupling of the digital inclinometer 502 to those surfaces.

Referring to FIG. 3, the example clamp 600 of FIGS. 6A and 6B can be clamped onto the example first trim tab 106a to measure the angular position 300 of the trim tab 106a relative to the chord 302 of the airfoil 304 of the rotor blade 104a. In such instances, the angular position of the chord 302 relative to gravity is known via any suitable technique (e.g., through experimentation and/or careful placement of the rotor blade 104a along a known plane). The trim tab 106a is inserted into the open side or opening 608 of the clamp 600 and the clamping mechanism 610 of FIGS. 6A and 6B secures the clamp 600 to the trim tab 106a such that the surface 614 is parallel to the trim tab 106a. The digital inclinometer 502 can then be coupled to the clamp 600 to calculate the angular position 300 of the trim tab 106a, which can be compared to the known angular position of the chord 302 to determine the angular position of the trim tab 106a relative to the chord 302. The example clamp 600 can be clamped onto the trim tab 106a at a plurality of locations traversing along the trim tab 106a.

Referring to FIG. 4, the example clamp 600 of FIGS. 6A and 6B can be clamped onto the trailing edge of the airfoil to measure the angular position 402 of the trailing edge relative to the chord 302 of the airfoil 304 of the rotor blade 104a. As described above, the opening 608 of the clamp 600 is placed over the trailing edge of the rotor blade 104 (e.g., at a portion of the trailing edge that does not include the trim tab 106a) and the clamping mechanism 610 of FIGS. 6A and 6B secures the clamp 600 to the trailing edge such that the surface 614 is parallel to the trailing edge. In the illustrated example of FIG. 4, the clamp 600 can be placed at a position indicated by arrow 404 on the trailing edge. The digital inclinometer 502 can then be coupled to the clamp 600 to calculate the angular position 402 of the trailing edge relative to the chord 302. The example clamp 600 of FIGS. 6A and 6B (or a second clamp constructed similarly as the example clamp 600 of FIGS. 6A and 6B or the example clamp 500 of FIG. 5) can be clamped onto the trim tab 106a as described above to measure the angular position 300 of the trim tab 106 relative to the chord 302. In the illustrated example of FIG. 4, the clamp 600 of FIG. 6A can be placed at a position indicated by arrow 406 on the trim tab 106a. The angular position 400 of the trim tab 106a relative to the trailing edge is calculated by taking the difference between the angular position 300 of the trim tab 106a relative to the chord 302 and the angular position 402 of the trailing edge relative to the chord 302. The angles 300, 400, and 402 of FIGS. 3 and 4 are shown as example angles with example reference lines (e.g., the chord 302). As described in detail below, additional or alternative angles with additional or alternative reference points can be calculated using the example disclosed herein.

Using the measurements described above taken by the digital inclinometer 502 in cooperation with the example clamp 600, an operator can adjust the trim tabs 106 and/or the trailing edges of the rotor blades 104 of the example helicopter 100 to ensure that the rotor blades 104 are rotating along a common plane of rotation.

Figure 7:
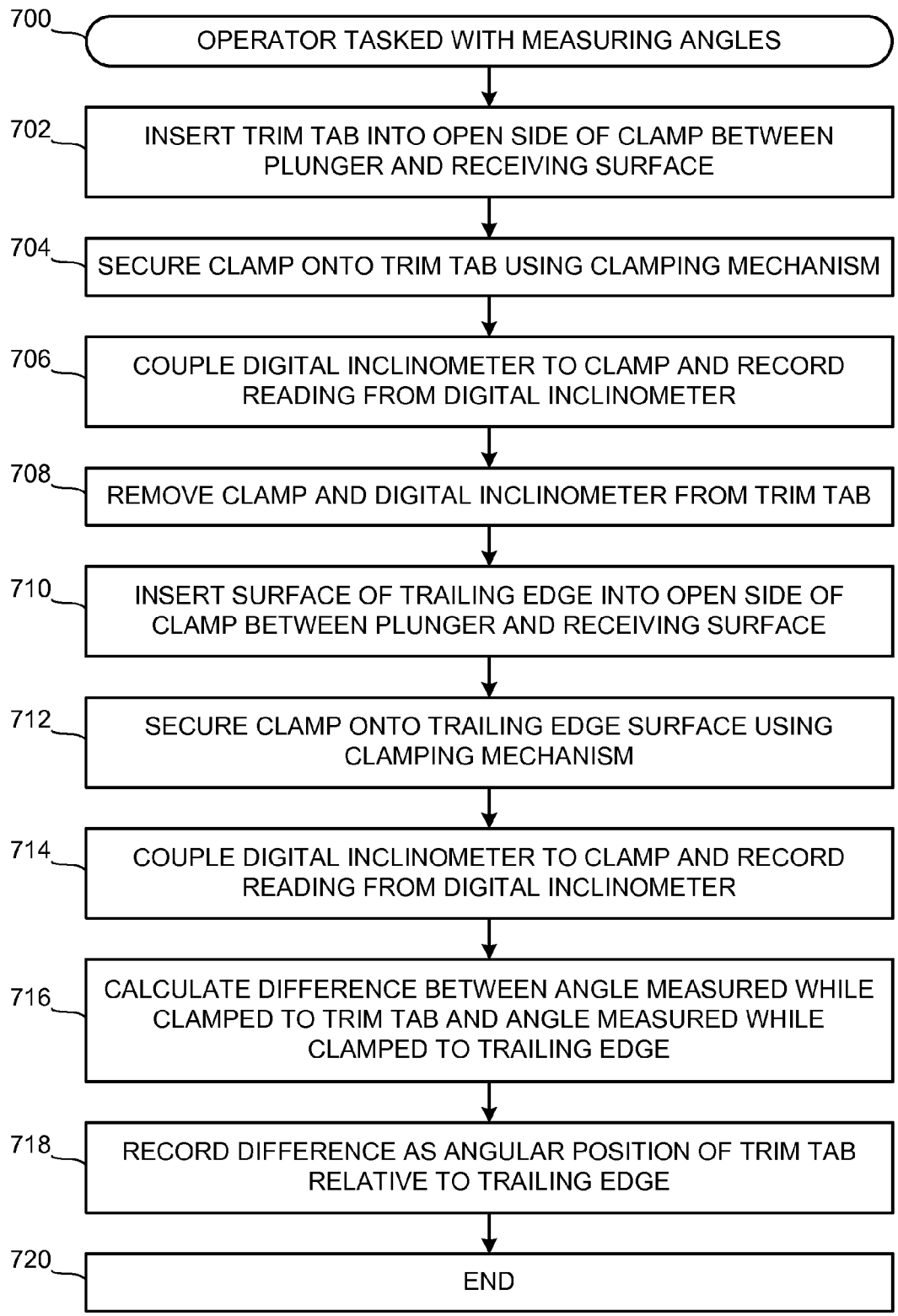
FIG. 7 is a flowchart representative of an example method to utilize the example clamp of FIGS. 5, 6A and/or 6B to measure an angular position of one or more components of the example rotor blades of FIGS. 1-4.

FIG. 7 is a flowchart representative of an example method that can be performed to measure an angular position of, for example, one or more of the trim tabs 106 of FIGS. 1-4 and/or one or more of the trailing edges of the rotor blades 104 of FIGS. 1-4. The example of FIG. 7 begins when an operator is tasked with measuring one or more angles associated with the rotor blades 104 of the example helicopter 104 of FIG. 1 (block 700). The angles(s) may require measurement as part of an alignment procedure to align each of the rotor blades 104 to a common plane of rotation. For example, the operator may be tasked with measuring an angular position of the trim tabs 106 relative to the chords of the airfoils of the corresponding rotor blades 104. Additionally or alternatively, the operator may be tasked with measuring an angular position of the trailing edges relative to the chords of the airfoils. Additionally or alternatively, the operator may be tasked with measuring an angular position of the trim tabs 106 relative to the angular position of the trailing edges. The example clamp 500 of FIG. 5 and/or the example clamp 600 of FIGS. 6A and 6B are capable of measuring each of these angles (and additional angles) in a precise, accurate, convenient and non-intrusive manner. While the example flowchart of FIG. 7 is described in connection with the example clamp 600 of FIGS. 6A and 6B, the example flowchart of FIG. 7 may be executed using the example clamp 500 of FIG. 5 as well as other example clamps constructed in accordance with the teachings of this disclosure.

To measure an angular position of the first one of the trim tabs 106a relative to the corresponding chord (e.g., the angular position 300 of FIG. 3), the operator inserts the trim tab 106a into the open side 608 of the example clamp 600 disclosed herein such that the trim tab 106a is placed between the plunger 612 and the receiving surface 614 (block 702). The operator rotates the handle 616 of the clamping mechanism 610 to force the plunger 612 onto the trim tab 106a (block 704). As a result, the trim tab 106a is secured to the clamp 600 with the trim tab 106a parallel to the first and third sides 602 and 606 of the clamp 600 and with the trim tab 106a perpendicular to the second side 604 of the clamp 600. If a digital inclinometer (e.g., the example digital inclinometer 502 of FIG. 5) has not already been coupled to the clamp 600, the operator couples a digital inclinometer to one of the sides 602 or 604 including embedded magnets strips 624 or 626 (block 706). Although shown with magnetic coupling material in the illustrated examples, the clamp 600 can include any suitable coupling mechanism to secure, couple, adhere, etc. the digital inclinometer to the clamp 600. The operator records an electronic reading from a display of the digital inclinometer representative of the angular position 300 of the trim tab 106a relative to the chord of the corresponding rotor blade 104a (block 706). As described above, the digital inclinometer has a resolution of 0.1 degrees or better, which is much higher than the resolution provided by previously available techniques (e.g., the pointer-dial technique described above that provided a resolution of approximately 0.5 degrees, at best).

In the example of FIG. 7, the digital inclinometer is then removed from the trim tab 106a by loosening the clamping mechanism 610 (block 708). As described above, the receiving surface 614 of the clamp 600 may be removable and replaceable to alleviate an unevenness that develops on the surface 614 due to, for example, wear and tear. To measure an angular position of the trailing edge of the rotor blade 104a relative to the corresponding chord (e.g., the angular position 402 of FIG. 4), the operator inserts the trailing edge of the rotor blade 104a into the open side 608 of the example clamp 600 disclosed herein such that the trailing edge is placed between the plunger 612 and the receiving surface 614 (block 710). The operator rotates the handle 616 of the clamping mechanism 610 to force the plunger 612 onto the trailing edge (block 712). As a result, the trailing edge of the rotor blade 104a is secured to the clamp 600 with the trailing edge parallel to the first and third sides 602 and 606 of the clamp 600 and with the trailing edge perpendicular to the second side 604 of the clamp 600. The operator couples the digital inclinometer to one of the sides 602 or 604 including embedded magnets 624 or 626 and the operator records an electronic reading from a display of the digital inclinometer representative of the angular position 402 of the trailing edge relative to the chord of the corresponding rotor blade 104a (block 714).

To calculate the angular position 400 of the trim tab 106a relative to the trailing edge of the rotor blade 104a, the operator calculates the difference between the angle recorded at block 706 and the angle recorded at block 714 (block 716). With reference to FIGS. 3 and 4, the difference to be calculated is the difference between the angle labeled with reference numeral 300 and the angle labeled with reference numeral 402. In some examples, the digital inclinometer may be programmed to calculate the difference. The operator records the calculated difference as the angular position 400 of the trim tab 106a relative to the angular position of the trailing edge 402.

Figure 8A:
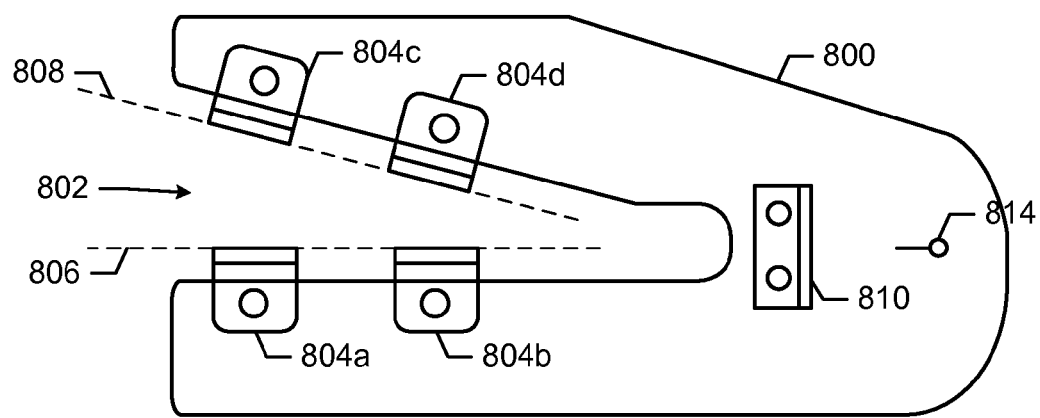
FIG. 8A is an illustration from a first perspective of an example rigid plate constructed in accordance with teachings of this disclosure.
Figure 8B:
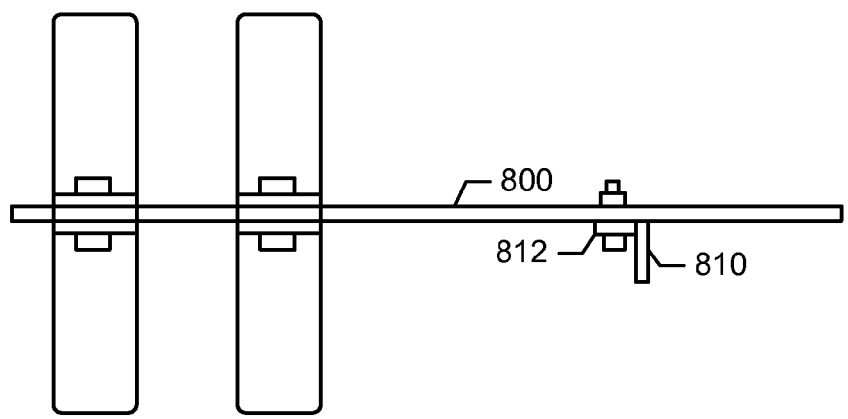
FIG. 8B is an illustration from a second perspective of the example rigid plate of FIG. 8A.

FIG. 8A and FIG. 8B illustrate an example rigid plate 800 constructed in accordance with teachings of this disclosure. The example rigid plate 800 of FIGS. 8A and 8B is configured to be mounted to, for example, the rotor blade 104 of FIGS. 1-4. In particular, the example rigid plate of FIGS. 8A and 8B is shaped to have an opening 802 in which the rotor blade 104 is to be received during a measurement process or procedure. The example rigid plate 800 of FIGS. 8A and 8B includes a plurality of brackets 804a-d that define first and second planes 806, 808 corresponding to the surfaces of the rotor blade 104 to which the rigid plate 800 is mounted. That is, the example brackets 804a-d of the rigid plate 800 are positioned at particular angles such that the first and second planes 806, 808 correspond to upper and lower planes of the airfoil 304 of the rotor blade 104. Thus, the example rigid plate 800 of FIGS. 8A and 8B has a shape corresponding to the airfoil 304 of the rotor blade 104 to be measured. Put another ways, the brackets 804a-d of the example rigid plate 800 define an opening having a complimentary shape to the airfoil 304 of the rotor blade 104.

The example rigid plate 800 of FIGS. 8A and 8B includes a surface 810 to receive an angle measurement device. The coupling of the angle measurement device to the example surface 810 is described below. In the illustrated example, the rigid plate 800 includes a bracket 812 to support the surface 810. However, the example surface 810 can be coupled to and/or integrated with the rigid plate 800 in any suitable manner. As described above in connection with FIG. 3, the airfoil 304 of the rotor blade 104 has a chord reference line 302. In the illustrated example, the rigid plate 800 includes a marking 814, such as an engraving that is aligned with the chord reference line 302 of the airfoil 304 when the rotor blade 104 is inserted into the opening 802 of the rigid plate 800. The example surface 810 of the rigid plate 800 is configured to be at a particular, known angle with respect to the chord reference line 302 of the airfoil 304 when the rigid plate 800 is placed on the rotor blade 104. In the illustrated example, the known angle is ninety degrees such that the surface 810 is perpendicular to the chord reference line 302 of the airfoil 304. However, the example surface 810 and/or the example bracket 812 can be positioned at any known, fixed angle with respect to the chord reference line 302.

In some examples, the surface 810 includes a magnetic portion and/or insert to enable an angle measurement device to be removably coupled to the surface 810. For example, the digital inclinometer 502 of FIG. 5 may be removably coupled to the surface 810 of FIGS. 8A and 8B via the magnetic material 518 of the digital inclinometer 502. While the example of FIGS. 8A and 8B utilizes magnetic material to couple an angle measurement device to the example rigid plate 800, additional and/or alternative devices and/or methods, such as mechanical fasteners for example, are available to provide the coupling, which can be removable or more permanently affixed. Moreover, alternative types of angle measurement devices may be used in connection with the example surface 810 of the rigid plate 800. Example angle measurement devices are described below in connection with FIGS. 12-13. As the example rigid plate 800 enables use of angle measurement devices capable of providing angular position readings at a resolution of, for example, 0.1 degrees, the example rigid plate 800 of FIGS. 8A and 8B and the surface 810 are precisely designed and constructed to provide the known angular relationship (e.g., ninety degrees, forty-five degrees, or zero degrees) between the surface 810 and the chord reference line 302 when the rotor blade 104 is inserted into the opening 802.

Figure 9:
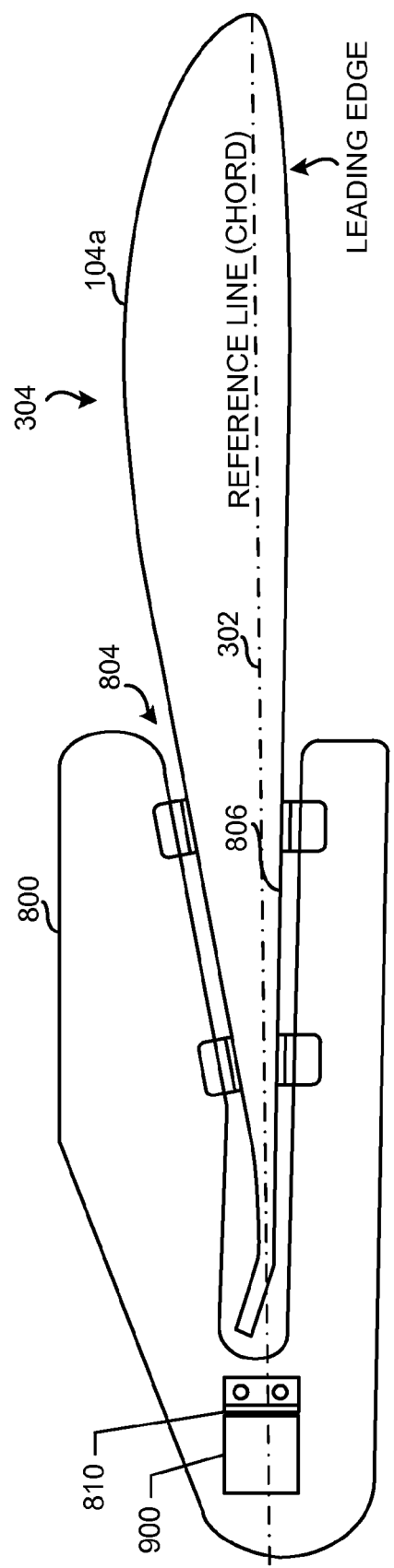
FIG. 9 is a schematic illustration of the example rigid plate of FIGS. 8A and 8B placed on the example rotor blade of FIGS. 1, 2 and/or 3.

Thus, when the example rigid plate 800 of FIGS. 8A and 8B is placed onto the rotor blade 104 and an angle measurement device is placed on the surface 810, a reading generated by the angle measurement device may be taken and recorded as the angular position of the chord reference line 302 of the airfoil 304. FIG. 9 shows the example rigid plate 800 of FIGS. 8A and 8B placed onto the rotor blade 104 during a measurement procedure or process. As shown in FIG. 9, the chord reference line 302 of the airfoil 304 is aligned with the first plane 806 defined by the brackets 804 due to the shape of the opening 804 being complimentary to the airfoil 304. Further, the example surface 810 of the rigid plate 800 is perpendicular to the chord reference line 302. Accordingly, when an angle measurement device 900 (e.g., the digital inclinometer 502 or one of the example angle measurement devices described below in connection with FIGS. 12-13) is coupled (for example, magnetically) to the surface 810, the angle measurement generated by the device 900 represents a reference angular position that is based on the chord reference line 302 of the airfoil 304. As described below, the reference angular position established via the example rigid plate 800 of FIGS. 8A and 8B may be compared to one or more angular positions of one or more components of the rotor blade 1014 (for example, the trim tab 106 and/or the trailing edge of the rotor blade 104).

FIGS. 10A and 10B are schematic illustrations of an example slotted block 1000 constructed in accordance with teachings of this disclosure. Like the example clamp 500 of FIG. 5, the example slotted block 1000 can be coupled to a component of, for example, the rotor blade 104 to provide a surface to receive an angle measurement device. The example slotted block 1000 of FIGS. 10A and 10B includes an opening or slot 1002 to receive the component that is undergoing an angular position measurement. The example opening 1002 of FIGS. 10A and 10B has a stepped profile. However, the example slotted block 1000 can have any suitable cross section or profile, such as a square, a rectangle, etc. Further, the example slotted block 1000 can be constructed of any suitable material and can be solid or hollow. In the illustrated example, the dimensions, materials, and shape of the slotted block 1000 are selected and designed to maximize a stiffness-to-weight ratio to minimize bending of the surface to be measured (e.g., the trim tab 106 or the trailing edge of the rotor blade 104).

The example slotted block 1000 is dimensioned such that a component to be measured (e.g., the trim tab 106) is inserted into the opening 1002. To secure the slotted block 1000 to the surface to be received through the opening 1002, the example slotted block 1000 of FIGS. 10A and 10B includes a clamping mechanism 1004 similar to the clamping mechanism 610 of FIGS. 6A and 6B. In particular, the example clamping mechanism 1004 of FIGS. 10A and 10B forces a plunger 1006 toward a surface 1008 of the opening 1002. Like the example clamp 500 of FIG. 5, the surface 1008 of the example slotted block 1000 of FIGS. 10A and 10B may include a removable and replaceable insert and is made from a wear resistant material to withstand repetitive engagement. The example clamping mechanism 1004 of FIGS. 10A and 10B includes a handle 1010 operatively coupled to the plunger 1006 and which can be rotated by a user to extend or retract the plunger 1006. While shown as including the handle 1010, the example clamping mechanism 1004 can include any suitable components or devices (e.g., toggle clamp(s), cam-type snapping mechanism(s), etc.) to secure the receiving surface 1008 of the slotted block 1000 to a surface to be measured (e.g., the trim tab 106) such that both sides of the surface to be measured contact the slotted block 1000.

In the illustrated example of FIGS. 10A and 10B, the receiving surface 1008 of the slotted block 100 is oriented at a known angle relative to a coupling surface 1012 that enables an angle measurement device to be coupled to the example slotted block 1000. In the example of FIGS. 10A and 10B, the coupling surface 1012 is oriented ninety degrees (perpendicular) relative to the receiving surface 1008. Accordingly, when an angle measurement device (e.g., the digital inclinometer 502 of FIG. 5 or one of the angle measurement devices of FIGS. 12-13) is coupled to the coupling surface 1012 of the example slotted block 1000, the angle between the receiving surface 1008 and the angle measurement device is known to be a right angle. In the illustrated example of FIGS. 10A and 10B, the coupling surface 1012 is made of a magnetic material such that a magnetic material of the angle measurement device can be coupled to the slotted block 1000. Additionally or alternatively, an angle measurement device can rest (e.g., lay flat) on the coupling surface 1012 without being fastened (e.g., mechanically or magnetically) to the slotted block 1000. Additional or alternative devices and/or techniques for receiving the angle measurement device via the coupling surface 1012 are possible.

Figure 11:
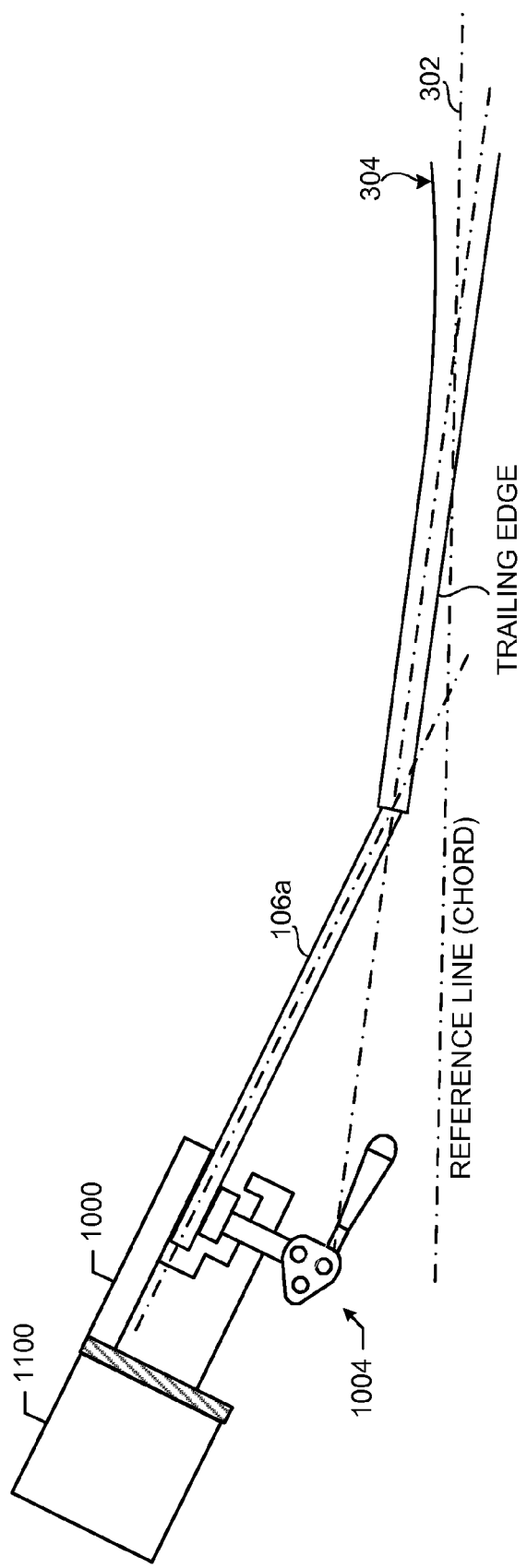
FIG. 11 is a schematic illustration of the example slotted block of FIGS. 10A and 10B coupled to the example trim tab of FIGS. 1, 2 and/or 3.

An accurate and precise reading can be taken from the angle measurement device coupled to (or resting on) the coupling surface 1012 while the example slotted block 1000 is secured to the component to be measured. FIG. 11 shows the example slotted block 1000 of FIGS. 10A and 10B secured onto the trim tab 106a of the example rotor blade 104. In particular, the example slotted block 1000 of FIGS. 10A and 10B is coupled to the trim tab 106a via the clamping mechanism 1004 and an angle measurement device 1100 is magnetically coupled to the coupling surface 1012 of the slotted block 1000. The example angle measurement device 1100 of FIG. 11 may be implemented by, for example, the example digital inclinometer 502 of FIG. 5 and/or one of the angle measurement devices of FIGS. 12 and 13. In the illustrated example of FIG. 11, the slotted block 1000 is secured to the trim tab 106a at the same time as the example rigid plate 800 of FIGS. 8A and 8B is placed on the rotor blade 104 (as shown in FIG. 9). As described above, the rigid plate 800 and the angle measurement device 900 coupled thereto provide a reference angular position corresponding to the chord reference line 302 of the airfoil 304 of the rotor blade 104. The measured angular position of the trim tab 106 provided by the example slotted block 1000 is compared to the reference angular position of the chord reference line 302 to calculate an angle of the trim tab 106 relative to the chord reference line 302. Put another way, when used in conjunction, the example rigid plate 800 of FIGS. 8A and 8B and the example slotted block 1000 of FIGS. 10A and 10B enable measurement of the angle of a component (e.g., the trim tab 106a or the trailing edge of the rotor blade 104) in relation to the airfoil 304 of the rotor blade 104.

Figure 12:
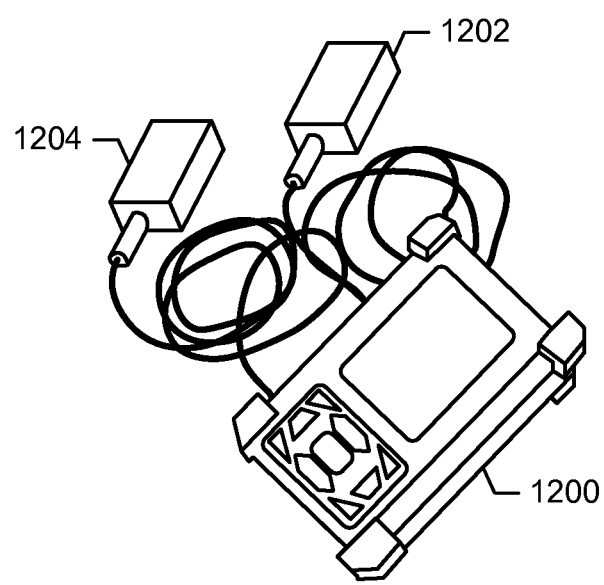
FIG. 12 is an illustration of an example digital differential angle protractor.

As the example rigid plate 800 of FIGS. 8A and 8B and the example slotted block 1000 of FIGS. 10A and 10B support digital angle measurement devices having a resolution of 0.1 degrees or better, highly accurate measurements that are crucial to proper functionality are made possible. Further, the example rigid plate 800 of FIGS. 8A and 8B and the example slotted block 1000 of FIGS. 10A and 10B enable simultaneous measurement of the relevant angular positions (e.g., the reference angular position and the measured angular position(s)). In some examples, a digital differential protractor having multiple sensors can be used to calculate a difference between the reference angular position provided by the example rigid plate 800 of FIGS. 8A and 8B and the measured angular position provided by the example slotted block 1000 of FIGS. 10A and 10B. An example digital differential protractor 1200 that may be used in connection with the example rigid plate 800 of FIGS. 8A and 8B and/or the example slotted block 1000 of FIGS. 10A and 10B is shown in FIG. 12. The example digital differential protractor 1200 receives data from a plurality of sensors, two of which are shown in FIG. 12 with reference numerals 1202 and 1204. The example sensors 1202, 1204 of FIG. 12 measure an angular position of a housing of the sensors 1202, 1204 relative to, for example, gravity or any other suitable reference. In some examples, the first sensor 1202 is positioned on (e.g., fastened to and/or rested upon) the surface 810 of the rigid plate 800 while the rigid plate 800 is placed on the rotor blade 104. At the same time, the second sensor 1204 is positioned on the coupling surface 1012 of the slotted block 1000 while the slotted block is secured to, for example, the trim tab 106. In such instances, the first sensor 1202 provides a reference angular position corresponding to the airfoil 304 and the second sensor 1204 provides a measured angular position corresponding to the trim tab 106. The example digital differential protractor 1200 receives signals representative of the angular positions from the sensors 1202, 1204 and uses the signals to, for example, calculate a difference between the reference angular position and the measured angular position.

Figure 13:
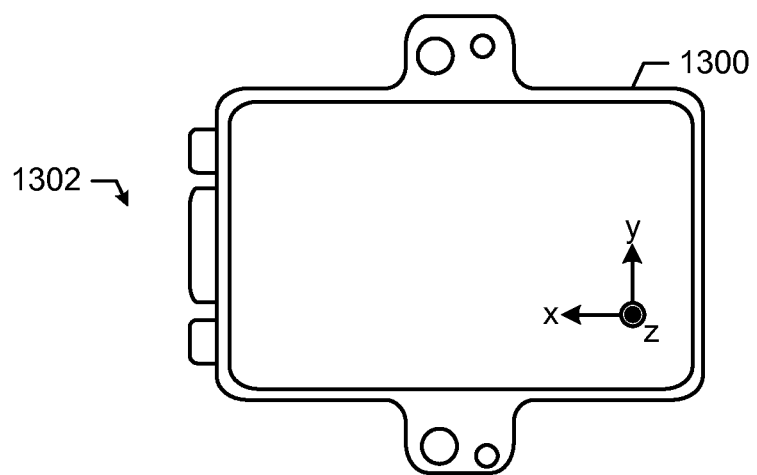
FIG. 13 is an illustration of an example micro sensor.

FIG. 13 illustrates another example angle measurement device that may be used in connection with the examples disclosed herein. In particular, FIG. 13 includes a miniature sensor 1300 capable of generating angular position data. In some examples, the miniature sensor 1300 is implemented by a 3DM-GX3®-25 sensor. In some examples, a first instance of the miniature sensor 1300 is positioned on (e.g., fastened to and/or rested upon) the surface 810 of the rigid plate 800 while the rigid plate 800 is placed on the rotor blade 104. At the same time, a second instance of the miniature sensor 1300 is positioned on the coupling surface 1012 of the slotted block 1000 while the slotted block is secured to, for example, the trim tab 106. In such instances, the miniature sensors 1300 are in communication with (e.g., via one or more ports 1302) a processor such that the processor can use data generated by the miniature sensors 1300 to calculate a difference between the reference angular position and the measured angular position. Additional or alternative types of sensor may be used in connection with the disclosed examples.

Figure 14:
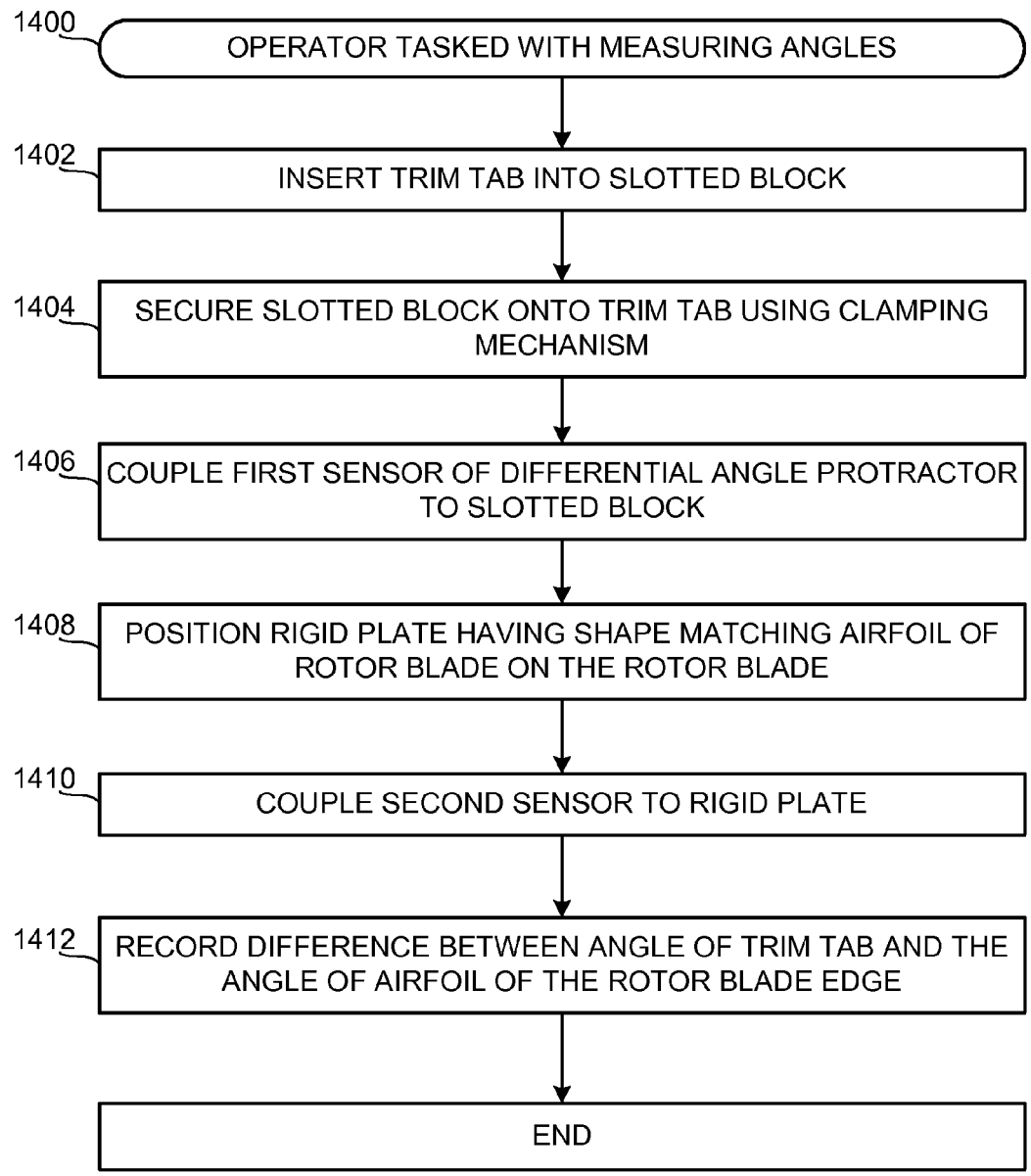
FIG. 14 is a flowchart representative of an example method to utilize the example rigid plate of FIGS. 8A and 8B and the example slotted block of FIGS. 10A and 10B to measure an angular position of one or more components of the example rotor blades of FIGS. 1-4.

FIG. 14 is a flowchart representative of an example method that can be performed to measure an angular position of, for example, one or more of the trim tabs 106 of FIGS. 1-4 and/or one or more of the trailing edges of the rotor blades 104 of FIGS. 1-4 relative to, for example, chord reference line 302 of the rotor blades 104. The example of FIG. 14 begins when an operator is tasked with measuring one or more angles associated with the rotor blades 104 of the example helicopter 104 of FIG. 1 (block 1400). The angles(s) may require measurement as part of an alignment procedure to align each of the rotor blades 104 to a common plane of rotation. For example, the operator may be tasked with measuring an angular position of the trim tabs 106 relative to the chord reference line 302 of the airfoil 304 of the corresponding rotor blades 104. While the example of FIG. 14 describes measurement of an angular position of the trim tabs 106 relative to the chord reference line 302 of the airfoil 304, the operator may be additionally or alternatively tasked with measuring an angular position of the trailing edges relative to the chord reference line 302 of the airfoil 304 of the corresponding rotor blades 104 and/or any other suitable component. While the example flowchart of FIG. 14 is described in connection with the example rigid plate 800 of FIGS. 8A and 8B and the example slotted block 1000 of FIGS. 10A and 10B, the example flowchart of FIG. 1400 may be executed using additional or alternative device(s) constructed in accordance with the teachings of this disclosure.

In the example of FIG. 14, the operator inserts the trim tab 106 into the opening 1002 of the example slotted block 1000 disclosed herein such that the trim tab 106 is placed between the plunger 1006 and the receiving surface 1008 (block 1402). The operator rotates the handle 1010 of the clamping mechanism 1004 to force the plunger 1006 onto the trim tab 106 (block 1404). As a result, the trim tab 106 is secured to the slotted block 1000 with the trim tab 106 at a known angle to the coupling surface 1012. In the example of FIG. 14, the first sensor 1202 of the example digital differential protractor 1200 of FIG. 12 is placed flush on the coupling surface 1012 (block 1406). The first sensor 1202 can rest on, and/or be fastened to the coupling surface 1012. Data regarding the angular position of the coupling surface 1012 is generated (e.g., continuously or periodically) via the first sensor 1202 and conveyed (e.g., continuously or periodically) to the digital differential protractor 1200.

In the example of FIG. 14, the rigid plate 800 of FIGS. 8A and 8B is placed on the rotor blade 104 while the slotted block 1000 is coupled to the trim tab (block 1408). In some examples, the rigid plate 800 may be adjusted (e.g., via an adjustment mechanism of one or more of the brackets 804*a-d*) such that the rigid plate 800 has a shape that matches (e.g., within a threshold) the airfoil 304 of the rotor blade 104 and, thus, mimics or is complimentary to the chord reference line 302. In the illustrated example, the operator places the second sensor 1204 of the digital differential protractor 1200 onto the surface 810 of the rigid plate 800. As described above, the second sensor 1204 conveys data representative of the angular position of the surface 810 (and, thus, the chord reference line 302) to the digital differential protractor 1200.

Accordingly, the first sensor 1202 has provided a measured angular position of the trim tab 106 (via the slotted block 1000) and the second sensor 1204 has provided a reference angular position of the chord reference line 302 (via the rigid plate 800). The example digital differential protractor 1200 uses the provided data to calculate, for example, a difference between the reference angular position and the measured angular position. In the example of FIG. 14, the operator records the calculated value generated by the digital differential protractor 1200 in, for example, a log (block 1412). The example of FIG. 14 then ends.

Accordingly, FIGS. 5-7 provide example methods and apparatus to measure one or more angular positions of one or more components of, for example, the rotor blade 104 of FIGS. 1-4. FIGS. 8-14 also provide example methods and apparatus to measure one or more angular positions of one or more components of, for example, the rotor blade 104 of FIGS. 1-4. In particular, FIGS. 8-14 illustrate methods and apparatus to obtain a first angular position of the rotor blade 104 to act as a reference angle, and to obtain a second angular position of a component of the rotor blade 104 (for example, the trim tab 106) to be measured. As described in detail below, the example methods and apparatus illustrated in FIGS. 8-14 provide a rigid plate (e.g., to establish a reference angular position) to be used in conjunction with an example slotted block (e.g., to measure an angular position of a component under test). Angular positions obtained via the example rigid plate and the example slotted block of FIGS. 8-14 are compared to determine a relative angular position of the component to be measured.

Figure 15:
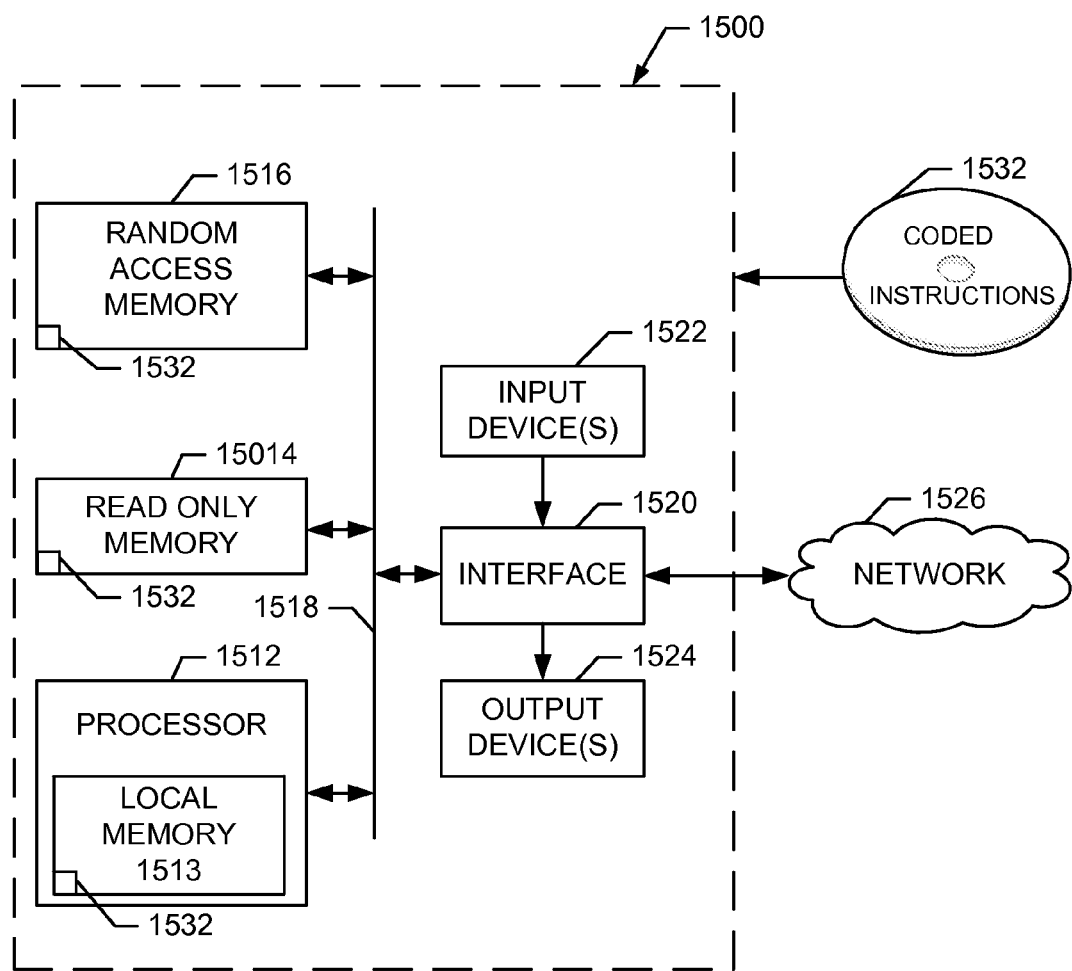
FIG. 15 is a block diagram of an example computer capable of implementing an example digital inclinometer, the example digital differential angle protractor of FIG. 12, and/or the example micro sensor of FIG. 13, in connection with the example clamp of FIGS. 5, 6A, and/or 6B, the example rigid plate of FIGS. 8A and 8B, and/or the example slotted block of FIGS. 10A and 10B.

FIG. 15 is a block diagram of an example computer 1500 capable of implementing the example digital inclinometer 502 of FIG. 5 and/or the example digital differential protractor 1200 of FIG. 12. The example computer 1500 of FIG. 15 includes a processor 1512. For example, the processor 1512 can be implemented by one or more microprocessors or controllers from any desired family or manufacturer.

The processor 1512 includes a local memory 1513 (e.g., a cache) and is in communication with a main memory including a volatile memory 1516 and a non-volatile memory 1514 via a bus 1518. The volatile memory 1516 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1514 may be implemented by flash memory and/or any other desired type of memory device. Access to the main memory 1514, 1516 is controlled by a memory controller.

The computer 1500 also includes an interface circuit 1520. The interface circuit 1520 may be implemented by any type of interface standard, such as an Ethernet interface, a universal serial bus (USB), and/or a PCI express interface.

One or more input devices 1522 can be connected to the interface circuit 820. The input device(s) 1522 permit a user to enter data and commands into the processor 1512. The input device(s) can be implemented by, for example, a button, a keyboard, a mouse, etc.

One or more output devices 1524 are also connected to the interface circuit 1520. The output devices 1524 can be implemented, for example, by display devices (e.g., a liquid crystal display, a cathode ray tube display (CRT)), a printer and/or speakers. One example display device is the digital display shown in FIG. 5 of the digital inclinometer 502. The interface circuit 1520, thus, typically includes a graphics driver card.

The interface circuit 1520 also includes a communication device such as a modem or network interface card to facilitate exchange of data with external computers via a network 1526 (e.g., an Ethernet connection, a digital subscriber line (DSL), a telephone line, coaxial cable, a cellular telephone system, etc.).

Coded instructions designed to operate the computer 1500 (e.g., the functionality of the digital inclinometer 502 and/or the digital differential protractor 1200) may be stored in the volatile memory 1516, in the non-volatile memory 1514, and/or on a removable storage medium such as a CD or DVD that can transfer the coded instructions onto the computer 1500.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to measure an angular position of a component, comprising:
   a C-shaped frame;
   an opening in the C-shaped frame to receive a component along a first plane; and
   a first magnetic coupler positioned along a first exterior side of the C-shaped frame to removably couple an inclinometer to the apparatus at a first angle relative to the first plane.

2. The apparatus as defined in claim 1, further comprising a second coupler positioned along a second exterior side of the C-shaped frame to removably couple the inclinometer to the apparatus at a second angle relative to the first plane.

3. The apparatus as defined in claim 2, wherein the first angle is ninety degrees relative to the first plane and the second angle is zero degrees relative to the first plane.

4. The apparatus as defined in claim 1, further comprising a mechanism to secure the component along the first plane to a receiving surface of the C-shaped frame, wherein the receiving surface is parallel to the first plane.

5. The apparatus as defined in claim 1, wherein the component comprises a trim tab of a rotor blade.

6. The apparatus as defined in claim 1, wherein the component comprises a trailing edge of a rotor blade.

7. The apparatus as defined in claim 1, further comprising a rigid plate including
   brackets to define a second opening having a shape complimentary to an airfoil of a rotor blade; and
   a first surface to removably couple the inclinometer to the rigid plate to establish a reference angle corresponding to an angular position of a chord of the airfoil.

8. The apparatus as defined in claim 7, wherein the first surface of the rigid plate is perpendicular to the chord of the airfoil.

9. An apparatus to measure an angular position of a component of a rotor blade, comprising:
   means for obtaining a reference angle having an opening to receive a portion of the rotor blade, the opening being shaped similarly to an airfoil of the rotor blade, wherein the means for obtaining the reference angle includes a first planar surface to receive a first sensor for obtaining the reference angle; and
   means for obtaining a measured angle of the component of the rotor blade, the means for obtaining the measured angle to be coupled to the component via a coupler such that a second planar surface of the means for obtaining the measured angle is aligned with the component, wherein the second planar surface is to receive a second sensor for obtaining the measured angle.

10. The apparatus as defined in claim 9, wherein the coupler comprises a rotatable handle operatively coupled to a plunger to force the means for obtaining the measured angle against the component of the rotor blade.

11. The apparatus as defined in claim 9, wherein the first planar surface of the means for obtaining the reference angle is perpendicular to a chord reference line of the airfoil when the rotor blade is inserted into the opening.

12. The apparatus as defined in claim 9, further comprising a processor coupled to the first and second sensors to calculate a difference between the first and second angles.

13. The apparatus as defined in claim 12, wherein the component is a trim tab and the calculated difference represents the angular position of the trim tab relative to the airfoil of the rotor blade.

14. The apparatus as defined in claim 12, wherein the component is a trailing edge of the rotor blade and the calculated difference represents the angular position of the trailing edge relative to the airfoil of the rotor blade.

15. The apparatus as defined in claim 9, wherein the means for obtaining the reference angle includes brackets to define the opening and to define the opening to correspond to the airfoil of the rotor blade.

16. A method to measure an angular position of a trim tab, comprising:
   securing a trim tab of a rotor blade to a receiving surface of a clamp;
   removably coupling an inclinometer to a first magnetic coupler positioned along a first exterior side of the clamp, the first exterior side of the clamp being oriented at a first angle relative to the receiving surface of the clamp;
   obtaining a first reading from the inclinometer as a first angular position of the trim tab while the inclinometer is coupled to the first exterior side of the clamp and while the trim tab is secured to the receiving surface of the clamp;
   positioning the rotor blade in an opening of an apparatus, the opening having a shape complimentary to an airfoil of the rotor blade; and
   obtaining a second reading from the inclinometer at a second angular position of a reference line of the airfoil.

17. The method as defined in claim 16, further comprising securing a trailing edge of the rotor blade to the receiving surface of the clamp.

18. The method as defined in claim 17, further comprising removably coupling the inclinometer to the first magnetic coupler of the clamp and recording a third reading from the inclinometer as a third angular position of the trailing edge while the inclinometer is coupled to the first exterior side of the clamp and while the trailing edge is secured to the receiving surface of the clamp.

19. The method as defined in claim 18, further comprising calculating a difference between the first angular position of the trim tab and the third angular position of the trailing edge.

20. A method as defined in claim 16, wherein the apparatus is a rigid plate having a planar surface oriented in relation to a chord of the airfoil when the rigid plate is placed on the rotor blade.

21. A method as defined in claim 16, wherein obtaining the second angular position includes electronically obtaining the second angular position via the inclinometer.

22. The method as defined in claim 16, further comprising adjusting brackets of the apparatus to define the opening to have the shape complimentary to the airfoil of the rotor blade.

23. A measurement system, comprising:
   a clamp to secure a component to a receiving surface, the clamp having a first exterior side to be oriented relative to the receiving surface at a first angle, wherein the first exterior side is to removably couple a first sensor of a digital protractor to the clamp at the first angle, and a second exterior side to be oriented relative to the receiving surface at a second angle, wherein the second exterior side is to removably couple the first angular position sensor of the digital protractor to the clamp at the second angle; and
   a rigid plate including an opening having a shape complimentary to an airfoil of a rotor blade, the rigid plate having a first surface to removably couple a second sensor of the digital protractor to the rigid plate.

24. A method as defined in claim 16, further comprising generating a difference between the first and second angular positions.

* * * * *